Figure 1:
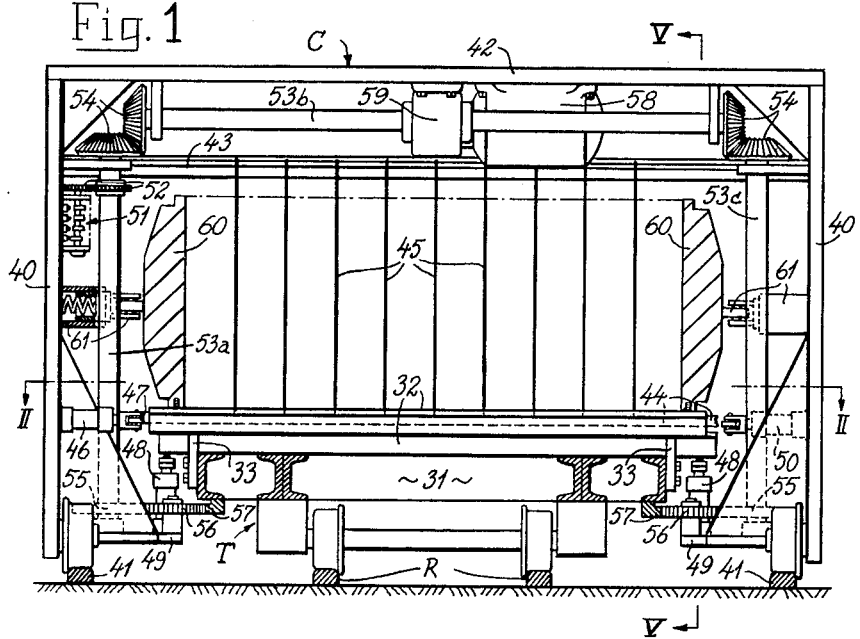

Sept. 7, 1965　　　　　　　I. AKERFORS　　　　　　　3,204,315
PLANT FOR MANUFACTURING CELLULAR CONCRETE PRODUCTS
Filed Sept. 25, 1962　　　　　　　　　　　　　　　2 Sheets-Sheet 1

INVENTOR
INGVAR AKERFORS
BY James M. Heilman
ATTORNEY

Sept. 7, 1965   I. AKERFORS   3,204,315
PLANT FOR MANUFACTURING CELLULAR CONCRETE PRODUCTS
Filed Sept. 25, 1962   2 Sheets-Sheet 2

*INVENTOR*
INGVAR AKERFORS
BY *James M. Heilman*
ATTORNEY

United States Patent Office 3,204,315
Patented Sept. 7, 1965

3,204,315
PLANT FOR MANUFACTURING CELLULAR CONCRETE PRODUCTS
Ingvar Åkerfors, Hamburg-Bergedorf, Germany, assignor to Casius Corporation Limited, Montreal, Quebec, Canada
Filed Sept. 25, 1962, Ser. No. 226,038
Claims priority, application Sweden, Nov. 25, 1961, 11,755/61
7 Claims. (Cl. 25—105)

In the manufacture of cellular concrete products for building purposes such as slabs and blocks it is common practice to first cast a relatively large body of the light weight concrete mass and to then cut this body into the desired pieces as soon as the expanded light weight concrete mass has solidified sufficiently to attain a plastic consistency. When cutting has taken place, the resulting products have to be cured or hardened by steam treatment in an autoclave and preferably such treatment is carried out while the cut out products still maintain their mutual positions from the cutting operation, i.e. without there taking place any rearrangement of the products between the cutting and the steam hardening process. This generally described procedure in the manufacture of cellular concrete products offers many appreciable advantages in comparison with casting the desired products or units separately one by one but has also, up to now, presented several problems most of them being concerned with transportation tasks within the manufacturing plant.

The handling of large bodies of substantial total weight already in itself involves a lot of technical difficulties but in this particular case those difficulties are considerably increased by the fact that the originally cast, large light weight concrete body as well as the smaller units or products cut out therefrom are very much sensitive to pressure and vibrations and have a very low resistance to rupture, i.e. a very low tensile strength, so that they show a great liability to crack unless the handling is most painstakingly performed.

Hitherto the manufacturing procedure above referred to has commonly included the following series of steps: first casting the light weight concrete body on a special casting bed, then transferring by means of suitable hoisting gears the solidified but still plastic, cast body to a cutting bed, on which cutting of the body is carried out, and finally again transferring the cut body to still another curing support which can follow the body into the autoclave during the curing process. These repeated transfers of the large and still plastic cellular concrete body very frequently cause damages to the body which result in extensive rejections and, hence, an impaired profit.

It thus appears to be an urgent need for a plant capable of manufacturing cellular concrete products in accordance with the general outlines indicated hereinbefore but in which all transfers of the plastic cellular concrete body, in its uncut as well as cut condition, from one support to another can be entirely avoided. This in turn requires that casting of the large cellular concrete body must take place on a support or bed which does not only permit cutting of the body but is also capable of following the cut up body into the autoclave during the curing of the products without suffering any damage therefrom. It should be easily understood that this raises very especial requirements particularly on the support for the body and, hence, on the plant as a whole. These requirements have been understood for a long time though men skilled in the particular art of manufacturing cellular concrete products have been unable to present any satisfactory solution of the problem involved.

Shortly speaking, the particular requirements above referred to are the following: The body supporting bed has to be firm enough to offer the plastic, cellular concrete body as well as the cut out products a reliable support. It has to be so constructed that it permits cutting of the body in any desired manner which in turn requires a certain movability of different parts of the bed under the body resting thereon which is in opposition to the beforementioned requirement for firmness. The supporting bed also has to be constructed as a truck or wheeled vehicle so that it can be easily moved between different stations in the plant. Furthermore, the bed structure has to be able to withstand the extreme heat and moisture conditions prevailing in the autoclave during the hardening or curing of the light weight concrete products and thus it must not present any delicate structural elements. Finally the body supporting structure ought to be easily adaptable to form a casting bed having a satisfactory tightness to be used directly as a mold bottom when completed with a removable mold frame of any suitable type.

This invention has for its object to provide improved plants for manufacturing cellular concrete products in the general way hereinbefore described, the said improved plants including not only a body supporting structure which fully meets the requirements mentioned but also additional means capable of cooperating with said body supporting structure in a manner permitting a practical and efficient manufacture of the products concerned.

In accordance with this invention the plant comprises in combination a body supporting structure presenting a frame, preferably formed as a truck, adapted to run on rails, said frame carrying a series of separate transverse sections forming together the body bearing surface of said structure, each of said sections being vertically movable between a body engaging and supporting elevated position relative to said frame, wherein said section is normally retained, and a lowered position, wherein said section is vertically spaced from the bottom side of said body, a cutting device by means of which the plastic cellular concrete body resting on said supporting truck may be cut up in its longitudinal direction, said cutting device presenting a cutting frame having upper and lower frame members transversing said body supporting structure and vertically extending cutting members stretched therebetween, the lower one of said frame members being arranged to pass freely under the body rested on said supporting structure as a result of successive lowering and reelevation of said transverse sections in front of and behind said lower frame member respectively, as cutting of said body is carried out by effecting a relative movement between said cutting device and said body supporting structure, and means for effecting said successive lowering and re-elevation of said movable transverse sections as the cutting of the body proceeds.

More in detail the present invention is concerned with the particular arrangements and means for actuating those transverse sections of the body supporting structure, and the main and generally characteristic feature of the invention is that said means for effecting the successive lowering and re-elevation of said movable transverse sections are incorporated in said cutting device and comprise actuating means mounted in front of said cutting frame for releasing each separate elevated transverse section of said body supporting structure in order to cause lowering thereof and vertically movable means at the rear of said cutting frame for engaging and again lifting up each such lowered transverse section.

Figure 2:
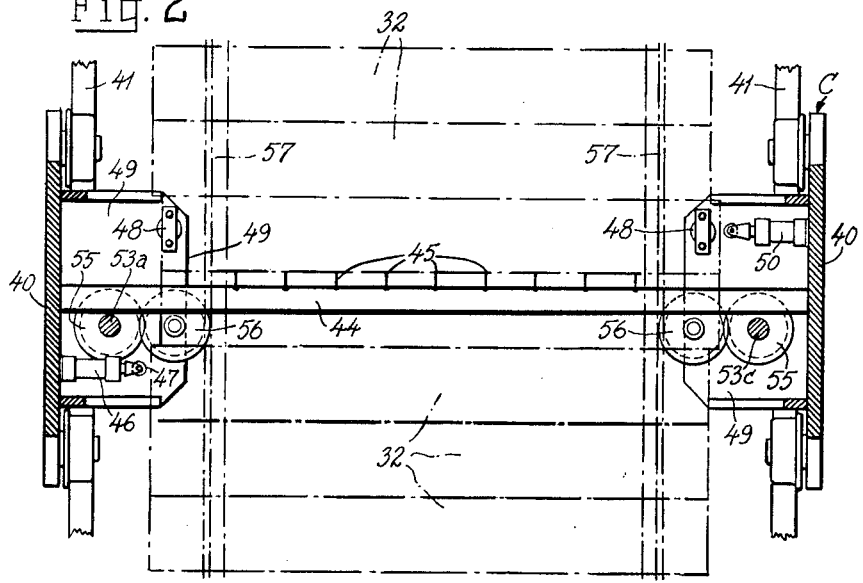
Figure 3:
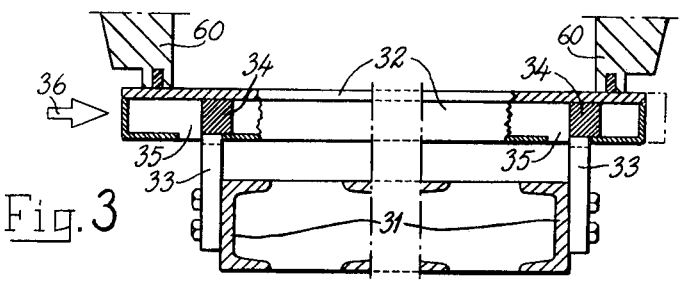
Figure 4:
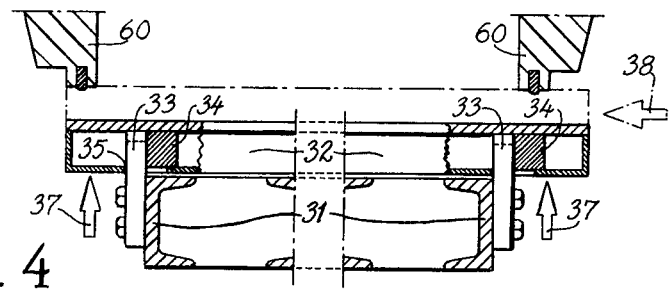
Figure 5:
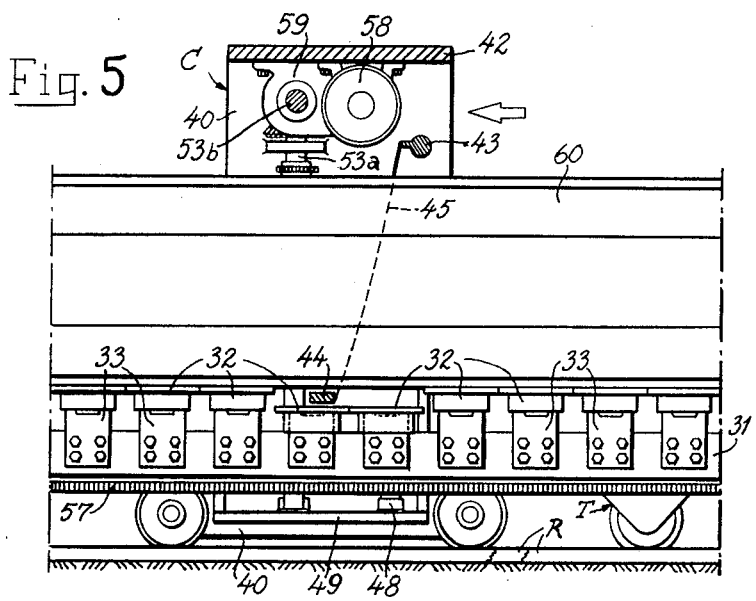

Further objects and features of the present invention will become apparent from the following detailed description of a preferred embodiment of the invention which has been slightly diagrammatically illustrated on the accompanying drawings. In the drawings:

FIG. 1 is a cross sectional elevation of a truck carrying a large cellular concrete body and also an end view of a related cutting device, FIG. 2 is a horizontal section of the cutting device of FIG. 1 taken along line II—II in said latter figure, some of the transverse sections of the truck being indicated therein by dash and dot lines, FIG. 3 illustrates in an enlarged scale how each of the transverse sections of the truck by being pushed laterally relative to the truck frame is caused to drop down to a lower level, FIG. 4 is a view similar to FIG. 3 and illustrating how the dropped down transverse section is returned to its initial position, and FIG. 5 is a partial longitudinal section taken substantially along the line V—V in FIG. 1.

In the illustrated plant a large cellular concrete body (not shown) is supposed to be supported on one and the same truck T, throughout the entire manufacturing procedure, i.e. already from the casting process up to the steam curing process. All hazardous transfers of the plastic cellular concrete body from one support to another are thereby avoided.

The truck T is easily movable on rails R between different stations in the plant so that casting and possible expansion of the cellular concrete body may take place directly on the truck at a first station, if so desired, cutting of the plastic body may be accomplished at a second station and, finally, the truck with the cut body resting thereon may be forwarded into an autoclave for steam curing of the cellular concrete products before the latter are unloaded from the truck.

The truck T, which runs on the rails R, has a frame 31 carrying a plurality of transverse body supporting section members 32 located side by side. As may be best seen from FIGS. 3 and 4, each such section member 32 takes the form of a hollow box-beam the respective end portions of which are normally rested on plate supports 33 projecting upwardly from the frame 31. More in detail the upper ends of the two plate supports 33 for each section member 32 normally engage through openings in the bottom of member 32 blocks 34 incorporated in the hollow box-beam. The bottom edges surrounding said openings will serve as guides for the upper ends of the plate supports 33 and define the proper position of rest of the section member 32 thereon. On the one side—in FIGS. 3 and 4 the left hand side—of each block 34 there is a free space 35 into which the related plate support 33 may enter when the hollow section member 32 has been slightly displaced to the right as indicated by the arrow 36 in FIG. 3. In practice this means that each section member 32 by being displaced laterally relative to the truck frame 31 will drop down into a lowered position shown in FIG. 4 and thus go out of contact with the cellular concrete body (not shown) which is supposed to rest on the truck. Each lowered section member 32 may then be returned to initial, elevated and body supporting position by first being lifted straight upwards as indicated by the arrows 37 in FIG. 4 and subsequently being pushed towards the left from the position shown in dash and dot lines in FIG. 4 as indicated by the arrow 38 so that it will again rest with its blocks 34 on the ends of the related supports 33. The described movements of each separate section member 32 are accomplished by actuating means on the cutting device C as will appear from the following.

The cutting device C in turn comprises two wheeled side pieces 40 movable on rails 41 on either side of the truck T, a top beam 42 joining the upper ends of said side pieces 40 and upper and lower cross members 43 and 44 respectively forming parts of a cutting frame in which cutting members or wires 45 are vertically stretched. The lower cross member 44 is arranged to pass under the plastic cellular concrete body (not shown) which is supposed to rest on the bearing surface of the truck T formed by the series of transverse section members 32 and in a free space provided by sequential lowering of said section members.

On the inside of the left hand side piece 40 in FIGS. 1 and 2 there is in front of the cutting frame provided a first pressure medium operated jack 46 the piston rod of which carries a roller 47 adapted to engage the left hand end of each separate section member 32 and to push said section member a small distance to the right each time pressure medium is supplied to the jack 46. Thus the jack 46 performs the actuation of the section member 32 indicated by the arrow 36 in FIG. 3. The jack piston and roller 47 is then immediately returned to initial position, e.g. by internal springs. The resulting displacement of each section member 32 causes the latter to drop down from its related supports 33 just in front of the lower frame cross member 44 so that said cross member can pass freely over it as in FIG. 5.

Immediately behind the cross member 44 each lowered section member 32 is then again lifted up by the aid of two pressure medium operated lifting jacks 48 arranged on either side of the truck T on shelves 49 provided on the insides of the side pieces 40 of the cutting device C. The two lifting jacks 48 are arranged to operate in synchronism and to accomplish the lifting of each separate section member 32 indicated by the arrows 37 in FIG. 4. As soon as each section member 32 has been lifted up to again contact the cellular concrete body resting on the truck T, another pressure medium operated jack 50 similar to the jack 46 and located in line with the lifting jacks 48 will be actuated to displace the lifted section member 32 towards the left as indicated by the arrow 38 in FIG. 4 thereby returning it to its initial body supporting position on the related supports 33.

The pressure medium supply to all the different jacks 46, 48 and 50 respectively is controlled by a series of cam actuated valves generally indicated at 51. The cams are mounted on a common shaft which through a gear transmission 52 is driven from a shaft 53 which is composed of three portions 53a, 53b and 53c interconnected by bevelled gears 54. The outer portions 53a and 53c of said shaft 53 extend vertically along the inside of each one of the side pieces 40 of the cutting device C and the intermediate shaft portion 53b extends along the lower side of the top beam 42. To the lower ends of the respective shaft portions 53a and 53c there are secured toothed wheels 55 which through intermediate wheels 56 engage racks 57 secured to either sides of the truck frame 31. Hence there will be a fixed relationship between the speed of rotation of the shaft 53 and the speed at which the cutting device C is passed along the truck T or the truck passes through the cutting device, as the case may be, and the valves at 51 will thus be actuated in the proper sequence to move the section members 32 at timed intervals.

In FIGS. 1, 2 and 5 the cutting device C is provided with a motor 58 which through a suitable gear box 59 drives the shaft 53 and thereby causes the cutting device C to move along the truck T or, alternatively, pulls the truck T through the cutting device C, all dependent on whether the truck or the cutting device is retained in stationary position. The power of the motor 58 is transmitted through the bevelled gears 54, the outer shaft portions 53a and 53c and the toothed wheels 55 and 56 to both the racks 57 whereby a balanced driving is secured. It should be understood, however, that the relative movement between the truck T and the cutting device C may as well be obtained by other driving means or simply by pushing or pulling the one structure along or through the other by hand, if so desired, and in such a case the entire arrangement with the sectional shaft 53 may be omitted and the cam shaft for the valves 51 be driven through a simplified gear transmission from e.g. the left hand rack 57 of the truck T only.

The pressure medium necessary for operating the various jacks in the cutting device C may be supplied by any suitable source such as a pump which may either be mounted on the cutting device itself or be located elsewhere in the plant and deliver the pressure medium to the cutting device through hoses or other suitable conduits.

As will be understood from the foregoing, each transverse body supporting section 32 is operated separately and the truck T may be provided with any desired number of such sections to thus be adapted to receive a cellular concrete body of any reasonable length. It is also apparent that the truck T, since it is only equipped with simple and robust mechanical accessories, may conveniently be used for supporting the cellular concrete products into which the cast body is cut also within the autoclave during the curing or hardening process, since there is no need for close tolerances or particular actuating means in the form of hydraulic or pneumatic jacks or cylinders in the truck construction.

Since the section members 32 of the truck T are arranged to the displaced laterally relative to the plastic cellular concrete body resting thereon, said body may need a lateral support so that no portions of the body are broken loose at such displacements. A suitable body support for this purpose may be provided by arranging simple battens or the like on both sides of the body near the lower edges thereof, but it has been found still more adequate to let the side walls 60 of the casting mold, in which the cellular concrete body has been previously cast and expanded directly on the truck, remain in contact with the body during the longitudinal cutting thereof. These mold side walls 60 are then maintained in positions by means of spring actuated pressure means 61 mounted inside each side piece 40 of the cutting device C as shown in FIG. 1.

The truck T is intended to be used for transporting the cut body into an autoclave (not shown) so that the plastic cellular concrete products can be subjected to a suitable steam treatment therein and be cured or hardened so that they may then be unloaded from the truck without particular care and immediately used or, if desired, transferred to storage. The truck T may, of course, be left in the autoclave during the entire performance of such steam treatment of the cut body, if desired, but thanks to the fact that all the section members 32 of the truck T are freely rested on the supports 33 of the truck frame 31 there is also the possibility to unload the section members 32 with the cut body resting thereon from the truck frame 31 as soon as the loaded truck T has entered the autoclave. Thereby the truck frame 31 may without delay go back to the production line and be equipped with another series of section members on which a new cellular concrete body may be cast and subsequently cut. Unloading of the section members with the cut body thereon may be accomplished by any suitable hoisting or other means in the autoclave which do not form part of the present invention.

It should also be mentioned that the lateral displacement of the transverse section members 32 of the truck T has been found very advantageous. As may be readily understood, there may between the plastic cellular concrete body and the transverse sections of the truck appear a certain adherence or bond which may cause inconveniences when said sections are to be lowered in front of the cutting frame. If such adherence or bond is rather strong it might prevent the sections from dropping by their own weight, and if the sections 32 are forced downwardly it might cause pieces of the plastic body to be broken loose from the bottom side of the body. However, by displacing the sections as shown and described such adherence or bond will be broken by shearing and this will assure proper dropping of the sections 32 by their own weight in spite of the fact that they are rather light and also effectively prevent damages on the plastic cellular concrete body.

What I claim is:

1. In a plant for manufacturing cellular concrete products, an apparatus for cutting a large size semiplastic body comprising, in combination, a body supporting structure including a movable main frame, a plurality of mutually separate transverse sections located above said main frame and cooperative means on said main frame and each of said sections for supporting each section at either one of two alternative, vertically spaced levels relative to said main frame, said sections forming, when in their upper position, the body bearing surface of said structure, and a cutting device including a substantially vertical cutting frame having cutting members arranged therein and presenting a lower cutting frame member transversing said body supporting structure, a mount carrying said cutting frame with its lower frame member just below the upper one of said alternative levels of said sections of the body supporting structure but still above the lower one of said two levels, means on said mount for actuating said sections of the body supporting structure in order to effect lowering of them, one by one, in front of said cutting frame as relative movement is imparted to said cutting device and body supporting structure in the longitudinal direction of the latter, and section engaging means on said mount operative to again elevate each lowered section to its upper position behind said cutting frame, said section engaging means comprising vertically movable jack means, and wherein each of said transverse sections of the body supporting structure is capable of lateral displacement relative to said main frame, and wherein said section actuating means of the cutting device includes means secured to said mount and operative to effect such lateral displacement and vertical displacement of each of said sections by contacting said sections and exerting a horizontal force thereto.

2. In a plant for manufacturing cellular concrete products, an apparatus for cutting a large size semiplastic body comprising, in combination, a body supporting structure including a movable main frame, a plurality of mutually separate transverse sections located above said main frame and cooperative means on said main frame and each of said sections for supporting each section at either one of two alternative, vertically spaced levels relative to said main frame, said sections forming, when in their upper position, the body bearing surface of said structure, and a cutting device including a substantially vertical cutting frame having cutting members arranged therein and presenting a lower cutting frame member transversing said body supporting structure, a mount carrying said cutting frame with its lower frame member just below the upper one of said alternative levels of said sections of the body supporting structure but still above the lower one of said two levels, means on said mount for actuating said sections of the body supporting structure in order to effect lowering of them, one by one, in front of said cutting frame as relative movement is imparted to said cutting device and body supporting structure in the longitudinal direction of the latter, and section engaging means on said mount operative to again elevate each lowered section to its upper position behind said cutting frame, said section engaging means comprising vertically movable jack means, and each of said transverse sections of the body supporting structure laterally movable relative to said main frame, and section supporting means being arranged to support each section at said upper level when said section is occupying a first lateral position relative to said main frame, and at said lower level when said section is occupying a second lateral position relative to said main frame, and said section actuating means of the cutting frame includes means operative to effect lateral displacement of each of said sections from said first to said second lateral position thereof to thereby cause said section to move into lowered position by its own weight, and said section engaging means include means for laterally displacing each elevated section from said second to said first lateral position thereof.

3. In a plant for manufacturing cellular concrete products by apparatus as claimed in claim 2, wherein said main frame of the body supporting structure and said mount of the cutting device have interengageable means for controlling the relative movement between said body supporting structure and cutting device, and wherein said section actuating means and said section engaging means of said cutting device include jack means governed by said interengageable means.

4. In a plant for manufacturing cellular concrete products, an apparatus as set forth in claim 2, wherein each of said transverse sections of the body supporting structure is removably supported on said main frame by said cooperative section supporting means.

5. In a plant for manufacturing cellular concrete products, an apparatus for cutting a large size semiplastic body comprising in combination: a wheeled body supporting structure including a main frame, a plurality of separate transverse sections located above said main frame, and cooperative means on said main frame and each of said sections for supporting each section at two alternative, vertically spaced levels relative to said main frame, said sections forming, when in their upper position, the body bearing surface of said structure, each section being displaceable between a first and a second lateral position relative to said main frame, and said cooperative section supporting means being arranged to support each section at the upper one of said two levels when the section occupies said first lateral position, and at the lower one of said two levels when the section occupies said second lateral position, and a cutting device including a substantially vertical cutting frame having cutting members arranged therein and presenting a lower frame member transversing said body supporting structure, a mount carrying said cutting frame with its lower frame member just below the upper one of said two alternative section levels but above the lower one of said two levels, means on said mount for displacing each of said sections from said first to said second lateral position thereof to thereby cause said section to drop to said lower level just in front of said cutting frame as relative movement is imparted to said cutting device and body supporting structure in the longitudinal direction of the latter, jack means on said mount at the rear of said cutting frame for again elevating each of said sections as the lower cutting frame member has passed thereover, means on said mount for displacing each section elevated by said jack means from said second to said first lateral position thereof to restore its original, body supporting position, and longitudinally extending lateral supports separate from said sections provided on both sides of said body to be cut to maintain the lateral position thereof relative to said main frame at the displacement of said sections.

6. In a plant for manufacturing cellular concrete products, an apparatus as claimed in claim 5, wherein said mount of the cutting device has resilient means arranged to engage and keep said lateral body supports in contact with the body to be cut.

7. In a plant for manufacturing cellular concrete products, an apparatus for cutting a plastic body comprising, in combination, a body supporting structure including a movable main frame, a plurality of transverse sections located above said main frame and cooperative means on said main frame and each of said sections for supporting each section, said sections forming, when in their upper position, the body bearing surface of said structure, and a cutting device including a substantially vertical cutting frame having cutting members arranged therein and presenting a lower cutting frame member transversing said body supporting structure, a mount carrying said cutting frame, piston means on said mount for moving said sections of the body supporting structure in a direction transverse to the movement of said plastic body in order to effect lowering of them, one by one, in front of said cutting frame as relative movement is imparted to said cutting device and body supporting structure in the longitudinal direction of the latter, and section engaging means on said mount operative to elevate each lowered section to its upper position behind said cutting frame, said section engaging means comprising vertically movable jack means.

References Cited by the Examiner

UNITED STATES PATENTS

| 2,694,846 | 11/54 | Olsson et al. | 25—105 |
| 2,978,777 | 4/61 | Carlsson et al. | 25—108 |
| 3,075,271 | 1/63 | Goransson | 25—108 |
| 3,088,186 | 5/63 | Mennitt | 25—107 |

J. SPENCER OVERHOLSER, *Primary Examiner.*

WILLIAM J. STEPHENSON, ROBERT F. WHITE,
*Examiners.*